Nov. 13, 1923. Re. 15,720

C. E. CARDWELL

COLLAPSIBLE BUNDLE RECEPTACLE

Original Filed Oct. 11, 1920 2 Sheets-Sheet 1

Inventor:

C. E. CARDWELL,

By W. J. Fitz Gerald & Co.

Attorney.

Nov. 13, 1923. Re. 15,720

C. E. CARDWELL

COLLAPSIBLE BUNDLE RECEPTACLE

Original Filed Oct. 11, 1920 2 Sheets-Sheet 2

Inventor:

C. E. CARDWELL,

By W. J. Fitz Gerald & Co.

Attorneys.

Reissued Nov. 13, 1923. Re. 15,720

UNITED STATES PATENT OFFICE.

CHARLES E. CARDWELL, OF HOUSTON, TEXAS, ASSIGNOR, BY DIRECT AND MESNE ASSIGNMENTS, OF ONE-HALF TO M. LANCASTER AND ONE-HALF TO MINOR STEWART, BOTH OF HOUSTON, TEXAS.

COLLAPSIBLE BUNDLE RECEPTACLE.

Original No. 1,377,114, dated May 3, 1921, Serial No. 415,973, filed October 11, 1920. Application for reissue filed April 10, 1923. Serial No. 631,217.

*To all whom it may concern:*

Be it known that I, CHARLES E. CARDWELL, a citizen of the United States, residing at Houston, in the county of Harris and State of Texas, have invented new and useful Improvements in Collapsible Bundle Receptacles, of which the following is a specification.

My present invention has reference to a bundle receptacle or basket for the running boards of automobiles or other similar supports.

My object is the production of a device for this purpose which is of a collapsible nature, which, when not in use, can be folded and arranged under the running board.

A further object is the production of a bundle receptacle or basket for the running boards of automobiles, and the like, including a side which is foldably connected to the running board of an automobile or other support and influenced by spring means whereby the same is normally moved under the said running board when released; and a still further object is to foldably attach to said side spring influenced ends, the springs whereof normally fold the same against the side when the ends are released, and the said ends, when the device is in its set up position, being engageable with elements on the upper face of the running board, and exerting pressure against the said elements to retain said ends and also the side in vertical position. The release of the ends permits of the same being folded against the side of the receptacle, and the springs of the said side fold the device as a whole under the running board, so that the device may be thus considered automatic in folding when released from said elements.

I attain the foregoing objects by a construction, combination and operative arrangement of parts, such as is illustrated by the drawings.

In the drawings:—

Figure 1:
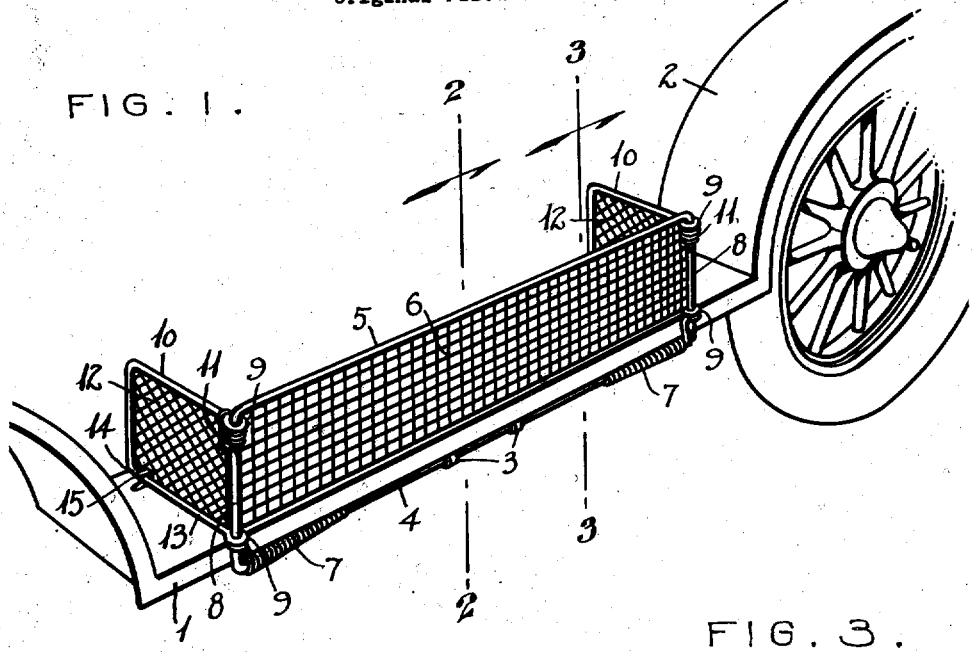
Figure 1 is a perspective view showing my device in set up position to provide a receptacle on the running board of an automobile.
Figure 3:
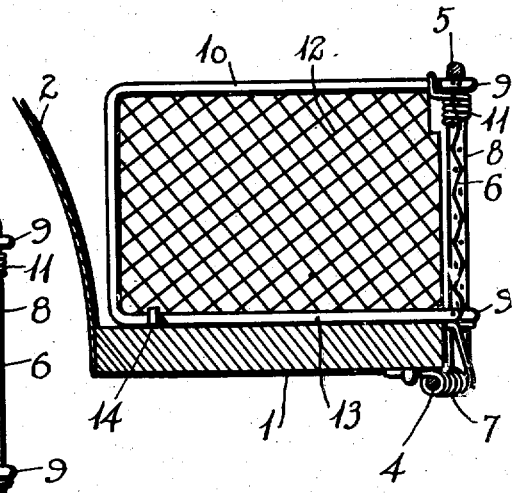
Fig. 3 is a sectional view approximately on the line 3—3 of Fig. 1.
Figure 2:
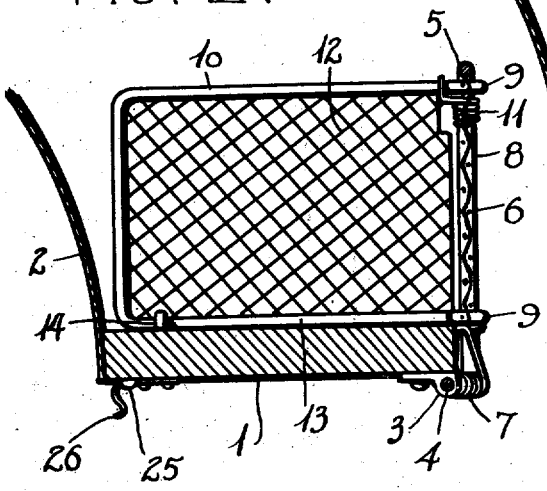
Fig. 2 is a sectional view approximately on the line 2—2 of Fig. 1.
Figure 4:
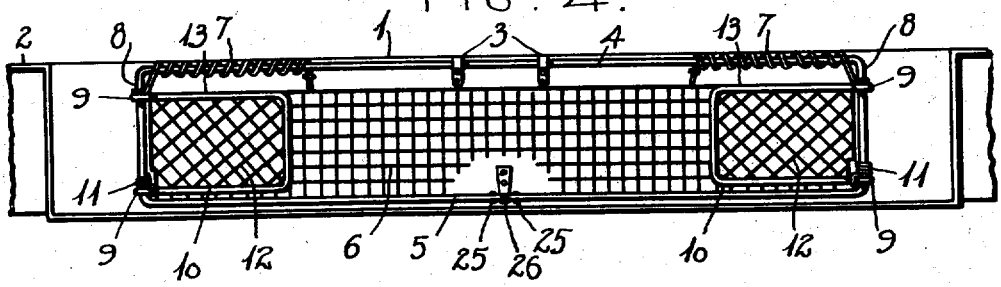
Fig. 4 is an underneath plan view of the running board with the device in inoperative position.

Referring now to the drawings in detail, the numeral 1 designates the running board of an ordinary automobile 2.

Hingedly connected to the under face of the running board, at the lower outer corner thereof, as at 3—3, is the lower longitudinal rod 4 of a substantially rectangular frame 5. The frame has a panel of reticulated material, such as a wire mesh which is indicated at the numeral 6. The frame 5 is influenced by coiled torsion springs 7 on the rod 4 which serve to normally swing the frame against the under face of the running board 1, the springs having their ends secured to the running board and frame 5. The hinged connection, however, is such as to permit of the frame assuming a vertical position against the outer edge of the running board when the frame is swung upwardly. The frame and its mesh panel provide the side or front wall of the collapsible bundle receptacle that forms the subject matter of this invention.

On the end members 8 of the frame 5 there are hingedly secured, as at 9, the terminals of U-shaped frames 10. These frames 10 are each materially shorter than the frame 5 and slightly less in height, and said frames 10 are influenced by coiled torsion springs 11 on the frame 5 whereby the said frames 10 are normally swung against one of the faces of the panel 6. The frames 10 have reticulated or mesh panels 12, and these frames and their panels provide the end members or walls of the bundle receptacle. The end members, when the device is in its set up position, have the lower bars 13 of their frames resting directly on the upper face of the running board, and on the said upper face of the running board there is a pair of spaced hooks 14. The hooks have their beaks 15 directed outwardly, or toward the opposite ends of the running board, and the springs 11 which influence the end frames 10 force the lower bars 13 thereof against the hooks and beneath the beaks thereof when the device is properly set up. The device, it will be noted, provides a substantially rectangular receptacle in which bundles may be received on the running board without danger of displacement by the shocks and jars to which the vehicle is subjected. The end members of the receptacle, when the receptacle is not required for use, are moved outwardly out of and above the hooks 14 and are caused by their springs 11 to fold against the side or front wall of the receptacle. A release of the hold on the side will permit of its springs 7 swinging both the side and ends beneath the running board. It will be seen that the receptacle is self folding when the ends are released from the hooks or keeper elements 14, and being wholly concealed under the running board when not in use offers no obstruction to the free use of the said running board.

Figure 5:
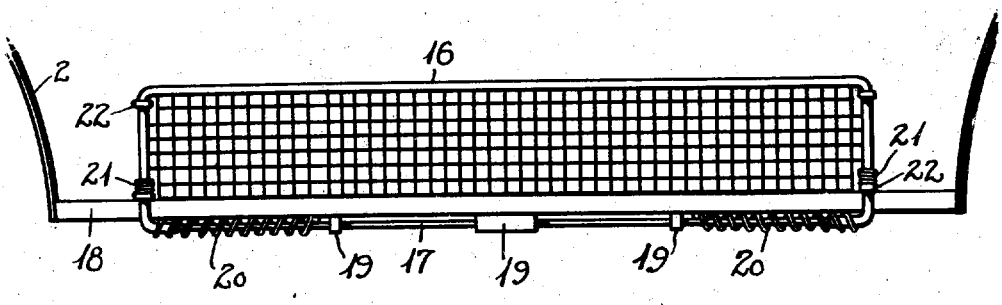
Fig. 5 is a front elevation of a slight modification.
Figure 6:
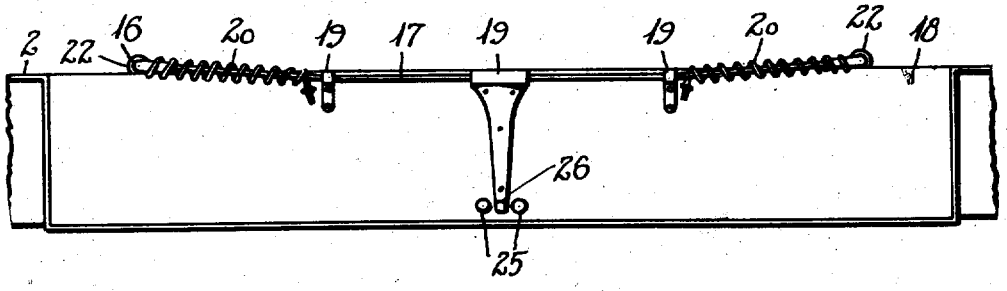
Fig. 6 is a bottom plan view thereof, the side of the receptacle being in its raised or operative position.
Figure 7:
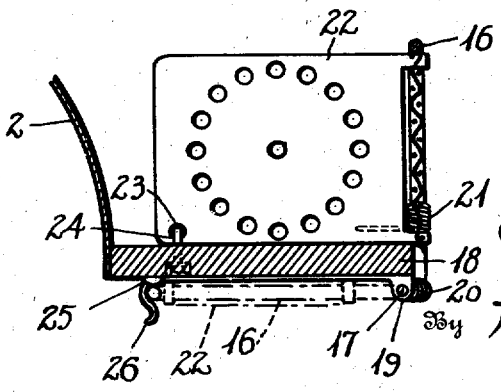
Fig. 7 is a vertical sectional view of the modified form of the device, showing adjacent parts of the automobile, the dotted lines illustrating the device in inoperative position.

In Figs. 5 to 7 I have illustrated a slight modification. In the said figures, the side or front wall of the receptacle comprises a wire frame 16 to which the reticulated panel is secured. The frame has its ends and upper portion constructed of comparatively heavy wire, but its lower portion 17 is constructed of comparatively thin wire. This thin wire 17 is bent inwardly between the ends thereof under the running board 18 and is hinged thereto by eyes 19. The wire 17 of the frame, outward of the eyes, is encircled by coiled torsion springs 20, one end of each of the springs being secured to the under face of the running board. The end members of the frame have hinged thereto end plates 22 influenced by the coiled springs 21 on the frame 16 to swing against the front side. The end plates each have an aperture 23 therethrough to receive the keepers or hooks 24 on the upper face of the running board. The springs for the end plates fold the same against the front wall or side. and the springs for the front wall or side swing the devices as a whole beneath the running board.

On the under face of the running board in either construction there may be buffers 25 with which the device contacts, and also on said under face there is a spring clip 26 to engage the upper longitudinal wire or free edge of the front wall of the device to hold it in folded position.

Having thus described the invention, what I claim is:—

1. In combination with a support having hooks on the upper face thereof, a collapsible receptacle, including a wall hingedly connected to the support, end members hingedly connected to the wall and spring influenced whereby the end members will be swung against the wall when released, and the said end members being engageable under the spring influence with the hooks when the said end members are moved over the support and the wall is brought to a vertical position.

2. In combination with a support, a collapsible receptacle therefor designed when not in use to automatically move beneath the support, said receptacle including a spring influenced outer member, and spring influenced end members designed to be normally folded against the outer member, and means on the support for engaging with the end members, when the device is brought to operative position, for holding the end members and the first mentioned member in upright vertical positions with respect to the support.

3. In combination with a support, a wall hingedly connected to the support to swing to erect and folded positions, a member hingedly connected with said wall to swing against and away from said wall, spring means tending to swing said member against the wall and to swing the wall to folded position, and means for fastening said member to the support when said wall is in erect position and said member is swung away from the wall.

4. In combination with a support, a wall hingedly connected with the support to swing to erect and folded positions, end members hingedly connected with said wall to swing against and away from said wall, spring means urging said members to swing against said wall and urging said wall to swing to folded position, and means for securing said members to the support when the wall is in erect position and said members are swung away from said wall.

5. In a collapsible receptacle, the combination with the running board of a vehicle, of a side wall disposed longitudinally of the running board and hingedly connected thereto at its outer longitudinal edge and normally supported in a vertical position, spring means normally urging the wall to a horizontal position beneath the running board, end walls hinged to the side wall and adapted to be folded upon the latter when not in use, and a clip arranged upon the under face of the running board for engagement with the free edge of the side wall to retain the latter against movement.

6. A collapsible receptacle comprising in combination with a support, a wall connected to the support to fold against said support, a spring-influenced member connected to said wall, and a keeper carried by the support for the engagement of said member under its spring influence when said wall is unfolded and brought to erect position.

7. A collapsible receptacle comprising in combination with a support, a wall hingedly connected to the support to swing against the support, a spring-influenced member hingedly connected to said wall to swing against said wall, and a keeper carried by the support for the engagement of said member under its spring influence when said wall and member are swung to erect position.

8. A collapsible receptacle comprising in combination with a support, a side wall connected to the support to fold against the support, spring-influenced end members connected to said wall, and keepers carried by said support for the engagement of said end members when said wall is unfolded and brought to erect position, said end members being held in engagement with said keepers under the spring influences thereof.

9. A collapsible receptacle comprising in combination with a support, a side wall hingedly connected to the support to swing against said support, spring-influenced end members hingedly connected to said side wall to swing against said wall, and keepers carried by the support for the engagement of said end members under their spring influences when said wall and members are swung to erect position.

In testimony whereof I affix my signature.

CHARLES E. CARDWELL.